No. 891,013. PATENTED JUNE 16, 1908.
J. H. SMITH.
METHOD OF REPRODUCING OBJECTS.
APPLICATION FILED JAN. 25, 1907.

3 SHEETS—SHEET 1.

WITNESSES

INVENTOR

No. 891,013. PATENTED JUNE 16, 1908.
J. H. SMITH.
METHOD OF REPRODUCING OBJECTS.
APPLICATION FILED JAN. 25, 1907.

3 SHEETS—SHEET 2.

WITNESSES
R A Balderson
J. B. Blaning

J Hammond Smith
INVENTOR

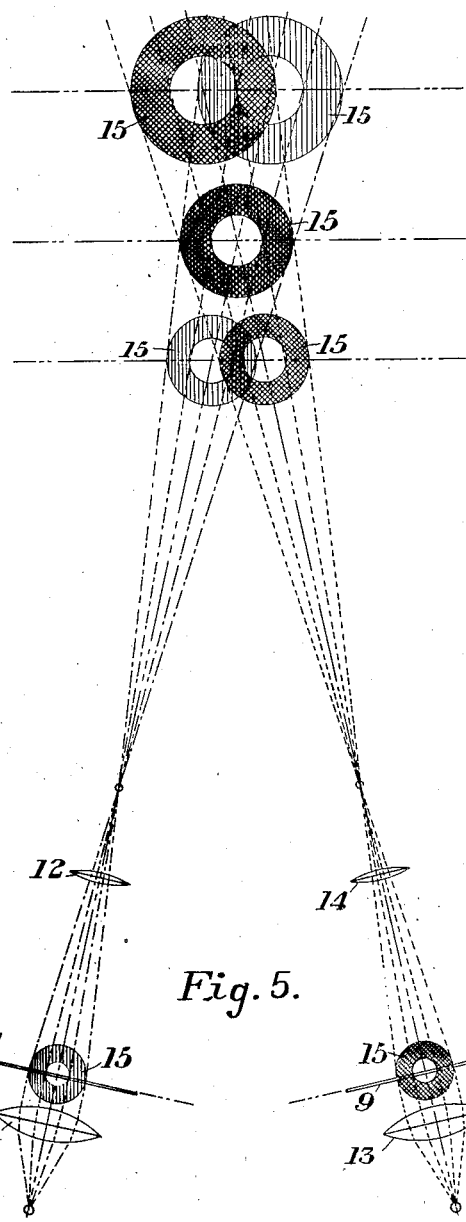

UNITED STATES PATENT OFFICE.

JOHN HAMMOND SMITH, OF ALLEGHENY, PENNSYLVANIA.

METHOD OF REPRODUCING OBJECTS.

No. 891,013.  Specification of Letters Patent.  Patented June 16, 1908.

Application filed January 25, 1907. Serial No. 353,988.

*To all whom it may concern:*

Be it known that I, JOHN HAMMOND SMITH, of Allegheny, Allegheny county, Pennsylvania, have invented a new and useful Method of Reproducing Objects, of which the following is a full, clear, and exact description, reference being had to the accompanying drawings, forming part of this specification, in which—

Figure 1:
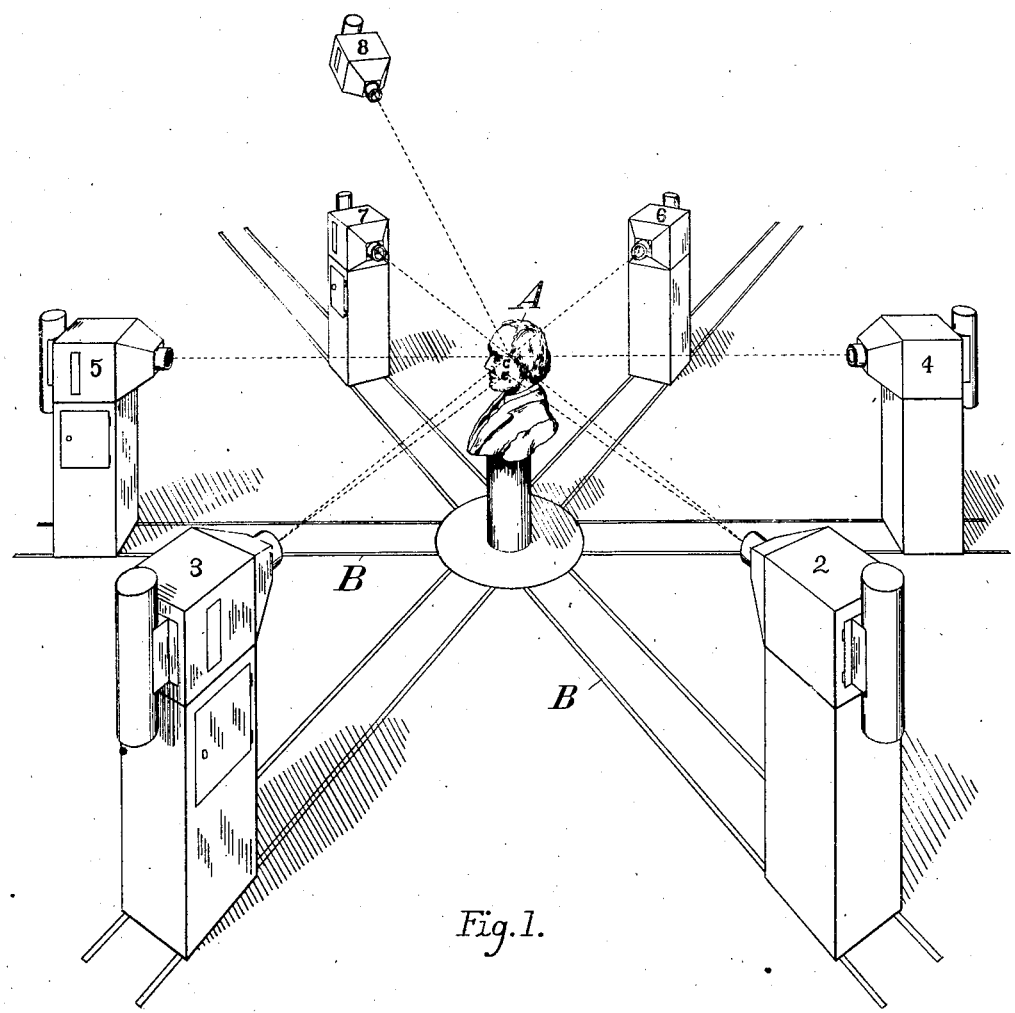
Figure 2:
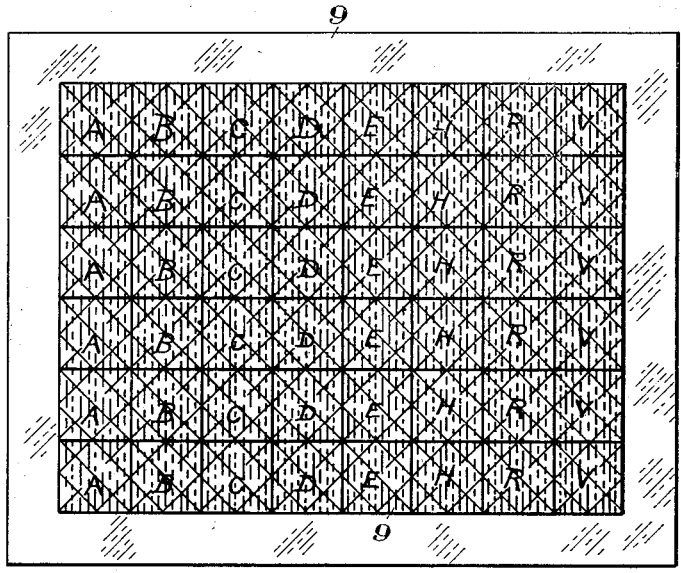
Figure 3:
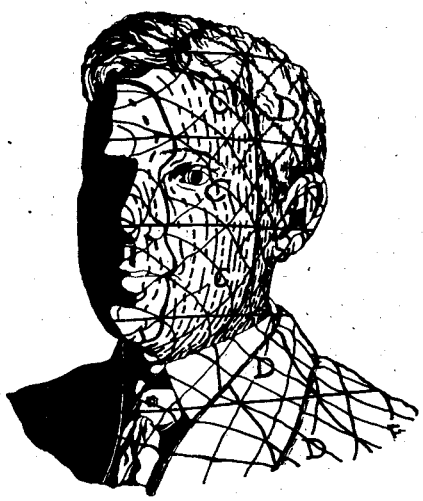
Figure 4:
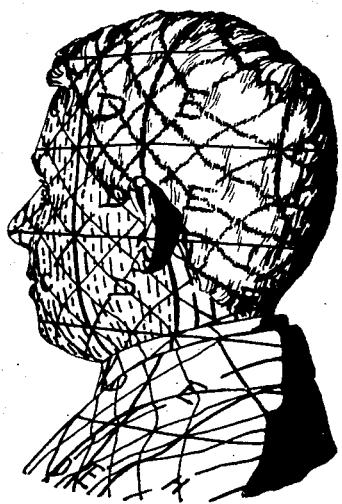

Figure 1 is a perspective view showing the optical system used in carrying out my invention; Fig. 2 is a plan view of one of the screens; Figs. 3 and 4 are views illustrating the manner in which the screen images are projected upon the object to be photographed and reproduced; and Fig. 5 is a diagram illustrating the principle of the invention.

My invention is especially designed to provide a method and apparatus for use in the production of all kinds of statuary, where it is possible to use an original as a model, or where it is possible to arrange a model after the original idea. It is especially useful where an exact likeness is desired, and where a variation in the size of the reproduction with respect to the model is necessary. For instance, a man may be used as a model, and his exact likeness reproduced in a statue of any reasonable size, either smaller or larger than the man himself. The model need be used but once, and then for a few moments only, its dimensions being recorded photographically, after which any number of statue copies may be produced by the aid of light projected through the photographic plates. As the dimensions are recorded photographically, models of the most delicate construction are not damaged or injured in any way.

My invention also provides a novel method for the illumination of the produced statues, whereby the natural and lifelike appearance thereof is greatly increased.

In carrying out my invention, in its preferred form the object to be reproduced is placed at the center of an optical system, consisting of a series of combined cameras and projecting lanterns, or camera projectors. This is illustrated in Fig. 1, in which the letter A designates the object to be reproduced,—in this case a bust.

2, 3, 4, 5, 6 and 7 designate a series of camera projectors arranged at different angles to the object and to be moved towards and away from the same on suitable guideways or tracks B. These camera projectors are shown as being in the same horizontal plane, but they may be arranged at any vertical angle to the object A, or two or more series of the projectors may be used at different angles, one of the second series of projectors being shown at 8 in Fig. 1. As will be seen, these various camera projectors are so arranged that their optical axes coincide upon the object A.

In one or more of the camera projectors, which is used simply as a projecting lantern, a screen 9 is placed, (see Fig. 2). This is a transparent screen, whose surface is divided into a multiplicity of sub-divisions by means of a series of lines or markings. The screen shown has vertical and horizontal lines intersecting each other to form large squares, each of which is designated by some identifying mark such as the letters shown. These large squares are further sub-divided by two series of intersecting oblique lines and by broken vertical lines. A screen of this character being placed in those projectors which are used simply as lanterns, extraneous light is shut out, and the images of these screens are projected by means of a strong light upon the object to be photographed. The effect of such projection is shown by Figs. 3 and 4, some of the broken vertical lines in these figures being, however, omitted. The other camera projectors are used as cameras, in which photographic plates are exposed, and the object A with the projected screen images thereon, is photographed. After this is done, the screens are removed from the lanterns and the object or model is illuminated by the lanterns, or from some outside source, such as flash-light or day-light, and other photographs of the model, still in the same position, are then taken, to be used in the illumination of the finished statue as hereinafter described.

The method of producing the statuary after the photographs have been taken in the manner described is as follows:—The developed photographic plates are returned to their respective positions in the camera projectors. These instruments are then used only as projecting lanterns, and generally only two at a time. If the statue is to be the same size as the model, the lanterns are left in their original positions; but if the statue is to be larger or smaller than the model, the instruments are moved to a greater or less distance. They must, of course, be in true alinement and properly focused in their new positions. The size of the reproduction relative to the model may also be varied in any other well known manner. A block of marble, or other material from which the statue is to be carved or built up, is then fixed in the position of the original model A. Supposing that one of the screens was originally used in the lantern 2 of Fig. 1, and that a photograph was taken by the camera 3, then in producing the statue the screen will be replaced in the lantern 2 and the photographic plate will be placed in the lantern 3. It will be seen, therefore, that the image of the screen and the photograph will be projected upon the block of marble, and that these two projections must coincide on the surface thereof, where the portions of such surface are made to conform to the model, the distinguished sub-divisions of the screen and the corresponding sub-divisions of the photograph also coinciding upon this surface. This will be readily understood by reference to the diagram of Fig. 5, in which the numeral 10 indicates the condensing lens of the lantern 3, 11 the photographic plate, and 12 the camera lens, while 13 is the condensing lens of the lantern 2, 9 is the screen, and 14 the lens. Supposing the image to be projected to be the circle 15, (revolved sections of which are shown), it will be seen that the projection of this circle from the screen and the photograph will coincide, as shown, at the point where the corresponding light beams of the two projections intersect, while the two images will not be exactly superimposed upon a surface which is nearer or more remote. The image projected from the lantern 2 will be dark, while that projected by the developed plate in the lantern 3 will be white and will exactly cover the dark image. As above explained, however, these two images will coincide only when the surface upon which they are projected corresponds to the original surface of the similar portion of the model. If this part of the surface of the material is nearer the sources of projection, the black image will appear to one side of the white image, while if the surface is farther from the sources of projection, the black image will appear upon the other side of the white image. Therefore, in making up the statue, the corresponding images projected from the two instruments must be made to coincide, by building up or carving out the material of the statue. Lights of different colors can be used in the projecting instruments to further increase the contrast of the two images.

Either negative or positive photograph plates may be used, as in either case the black markings from either projection will be superimposed by the white markings from the other projection. The positive plates, however, are found most convenient on account of the positive image of the model thus obtained. The positive plates may be used in conjunction with negative plates, however, without departing from the principle of the invention.

In making the complete statue, successive portions thereof are built up or carved out in the manner described, the development of each portion being accomplished by the use of the photograph taken of that particular portion in conjunction with the projected image of the screen.

Instead of using photographs of the object to be reproduced, I may use two mechanically made screens representing different views of the object, or views taken at different angles. The projected images of these two screens may then be combined in reproducing the object.

Two photographs of the object may also be used, instead of one screen and one photograph. Various kinds of screens with respect to the character of the markings or sub-divisions thereon may also be used. Thus screens may be made by interposing or placing any opaque material in the optical system of the projector in such a way as to produce markings by projection on the model. And by the term screen as used in the claims, I intend to mean any distinguishing arrangement of lines or markings whose images or shadows can be projected upon the model.

A very striking effect may be produced by illuminating the finished statuary in the following manner:—The camera projectors are used as projecting lanterns with slides made from the second set of negatives which were taken when the model was being photographed, as before explained. Instead of projecting the image of the model on a flat surface, as is ordinarily done, producing a flat picture, the image from these slides is projected on the statue at the proper angle and distance. The combined effect of the statue and of the picture projected thereon, both of which bear a likeness to the original model, is a very striking one, possessing a degree of artistic completeness which cannot be obtained by either the picture or statue alone. When a statue is to be illuminated in this way, a number of small projecting lanterns must be installed in the place of exhibit, at the proper angle and distance to produce the proper illumination, these lanterns having the same optical arrangement as the standard camera projectors used in making the statuary.

The possibilities and advantages of this invention, together, with its possible modifications, will be readily appreciated by sculptors, as the invention greatly increases their resources and enables them to produce exact likenesses, while at the same time they are left free to exercise their artistic skill in the execution of the work and in any modifications thereof which may be desired.

The reproductions may be either larger or smaller than the model; and any desired number of copies may be made from a single set of photographs, either at once or after the lapse of time.

What I claim is:—

1. The method of reproducing objects, which consists in simultaneously projecting two images having distinguishing lines or markings at different angles, and shaping the surface upon which such images are projected to cause their corresponding lines or markings to coincide; substantially as described.

2. The method of reproducing objects, which consists in first projecting the image of a screen upon a model, then photographing the model with the projected image thereof, and then projecting the photograph and the image of the screen coincidentally upon the material from which the object is to be reproduced, and building up or carving such material until the projections coincide; substantially as described.

3. The method of reproducing objects, which consists in first projecting the image of a screen upon a model, then photographing the model with the projected image thereon, and then projecting the photograph and the image of the screen upon the material from which the object is to be reproduced, the angle between the optical axes of the two projections being the same as the angle between the original optical axes; substantially as described.

4. The method of reproducing objects, which consists in first projecting the image of a screen upon a model, then photographing the model with the projected image thereon, and then simultaneously projecting the photograph and the image of the screen upon the material from which the object is to be reproduced, the angle between the axes of these two projections being the same as the angle between the original axes of projection, and varying the length of such axes to vary the size of the reproduction with respect to the size of the model; substantially as described.

5. The method of reproducing objects, which consists in placing the object to be reproduced, or model, at the center of an optical system, projecting a screen image thereon, and photographing the model with the projected screen image at different angles, and then projecting the photographs and the screen images, successively upon different portions of the material from which the object is to be reproduced, the angle between the optical axes of the projections being the same as the angle between the original optical axes of the projection and photograph; substantially as described.

6. The method of reproducing objects, which consists in illuminating a model and at the same time projecting thereon an image, photographing the object with the projected image at different angles, and then projecting the photographs and similar images at the same angles as the original projections, and building up or carving a statue by the aid of these projections; substantially as described.

7. In the reproduction of objects, the method which consists in projecting a screen image, and a photograph of a model having the same screen image projected thereon, at such angles that the various markings of the two projections will coincide at definite points, and producing at such points a statue by shaping the statue surface to cause the two projections to coincide thereon; substantially as described.

8. The method of reproducing objects, and displaying the reproduced object which consists in simultaneously projecting two images at different angles, and shaping the surface upon which such images are projected to cause their corresponding lines or markings to coincide, and then illuminating the reproduction and projecting thereon a photograph of the model; substantially as described.

9. The method of reproducing objects, and displaying the reproduced object which consists in first projecting the image of a screen upon a model, then photographing the model with the projected image thereon, and then projecting the photograph and the image of the screen coincidentally upon the material from which the object is to be reproduced, and building up or carving such material until the projections coincide, and illuminating the reproduction and projecting thereon a photograph of the model; substantially as described.

10. In the method of reproducing objects, the step which consists in projecting upon a model systematically disposed lines or markings and photographing the model with such lines or markings thereon; substantially as described.

In testimony whereof, I have hereunto set my hand.

J. HAMMOND SMITH.

Witnesses:
  H. M. CORWIN,
  GEO. H. PARMELEE.